United States Patent
Wan et al.

(10) Patent No.: US 12,225,241 B2
(45) Date of Patent: Feb. 11, 2025

(54) INTRA PREDICTION METHOD AND DECODER FOR GEOMETRIC-BASED POINT CLOUD CODING

(71) Applicant: GUANGDONG OPPO MOBILE TELECOMMUNICATIONS CORP., LTD., Guangdong (CN)

(72) Inventors: Shuai Wan, Guangdong (CN); Fuzheng Yang, Guangdong (CN); Lei Wei, Guangdong (CN); Zhecheng Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 120 days.

(21) Appl. No.: 17/810,791

(22) Filed: Jul. 5, 2022

(65) Prior Publication Data
US 2022/0337884 A1 Oct. 20, 2022

Related U.S. Application Data (63) Continuation of application No. PCT/CN2020/070556, filed on Jan. 6, 2020.

(51) Int. Cl.
*H04N 19/96* (2014.01)
*H04N 19/105* (2014.01)
(Continued)

(52) U.S. Cl.
CPC ........... *H04N 19/96* (2014.11); *H04N 19/105* (2014.11); *H04N 19/159* (2014.11); *H04N 19/1883* (2014.11)

(58) Field of Classification Search
None
See application file for complete search history.

(56) References Cited

U.S. PATENT DOCUMENTS 11,206,426 B2 * 12/2021 Sugio .................. H04N 19/463
2019/0087979 A1 * 3/2019 Mammou ............ H04N 19/597
(Continued)

FOREIGN PATENT DOCUMENTS

| CA | 3104630 A1 | 1/2020 |
|----|------------|--------|
| CN | 109889840 A | 6/2019 |

(Continued)

OTHER PUBLICATIONS

G-PCC codec description, 128, MPEG Meeting, Geneva; (Motion Picture Expert Group or ISO/IEC JTC1/SC29/WG11), Dec. 18, 2019. 74 pages.
(Continued)

*Primary Examiner* — Chikaodili E Anyikire
(74) *Attorney, Agent, or Firm* — PERKINS COIE LLP (57) ABSTRACT

An intra prediction method and a decoder are provided. The method includes the following. Coordinate information of a current node and a current level corresponding to the current node are determined. A current quantity is determined based on the current level, where the current quantity is positively correlated with the current level. Current neighbour nodes are determined based on the coordinate information of the current node, where the current neighbour nodes are neighbour nodes of the current quantity among neighbour nodes of a parent node of the current node. Intra prediction is performed on the current node based on the coordinate information of the current node and the current neighbour nodes.

20 Claims, 5 Drawing Sheets

(51) Int. Cl.
*H04N 19/159* (2014.01)
*H04N 19/169* (2014.01)

(56) References Cited

U.S. PATENT DOCUMENTS

| | | | |
|---|---|---|---|
| 2020/0280710 A1* | 9/2020 | Vosoughi | H04N 19/14 |
| 2020/0351484 A1* | 11/2020 | Aflaki | G06T 7/41 |
| 2022/0417557 A1* | 12/2022 | Oh | G06T 9/001 |

FOREIGN PATENT DOCUMENTS

| | | | |
|---|---|---|---|
| CN | 110418135 A | | 11/2019 |
| EP | 4040793 A1 | | 8/2022 |
| WO | 2017126314 A1 | | 7/2017 |
| WO | 2019011636 A1 | | 1/2019 |
| WO | 2019082837 A1 | | 5/2019 |
| WO | 2021049758 A1 | | 3/2021 |

OTHER PUBLICATIONS

Shuai Wan et al: [G-PCC] [New proposal] On geometry intra prediction, 128, MPEG Meeting, Geneva; (Motion Picture Expert Group or ISO/IEC JTC1/SC29/WG11), Oct. 8, 2019. 3 pages.
The extended European search report issued in corresponding EP application No. 20912642.4 dated Dec. 12, 2022. 14 pages.
Wei, Honglian et al. Enhanced Intra Prediction Scheme in Point Cloud Attribute Compression, 2019 IEEE Visual Communications and Image Processing (VCIP), Dec. 4, 2019.
Zhang, Ke et al. Point Cloud Attribute Compression via Clustering and Intra Prediction, 2018 IEEE International Symposium on Broadband Multimedia Systems and Broadcasting (BMSB), Jun. 8, 2018.
WIPO, International Search Report and Written Opinion for International Application No. PCT/CN2020/070556, Oct. 12, 2020.

* cited by examiner

INTRA PREDICTION METHOD AND DECODER FOR GEOMETRIC-BASED POINT CLOUD CODING

CROSS-REFERENCE TO RELATED APPLICATION(S)

This application is a continuation of International Application No. PCT/CN2020/070556, filed Jan. 6, 2020, the entire disclosure of which is hereby incorporated by reference.

TECHNICAL FIELD

Embodiments of the present application relate to video coding technologies in the communication field, and in particular to an intra prediction method and a decoder.

BACKGROUND

In an encoder framework of geometry-based point cloud compression (G-PCC), after an input point cloud is partitioned into slices, each slice is encoded independently. For each slice, geometry information of the point cloud and attribute information corresponding to each point in the point cloud are encoded separately.

At present, in terms of the level or depth of octree partition, encoding of geometry information can include two frameworks: octree-based geometry information encoding and trisoup (triangle soup)-based geometry information encoding. In the framework of octree-based geometry information encoding, coordinate transform is performed on the geometry information so that the whole point cloud is contained in a bounding box. Then, quantization is performed on coordinates. Due to the rounding of quantization, there will be points with the same coordinates after quantization. Therefore, whether to remove duplicate points is determined according to initial setting parameters. The process of quantizing and removing the duplicate points is also called voxelization. Then, the bounding box is equally partitioned into eight sub-cubes, and occupancy information of each sub-cube (1 is non-empty, 0 is empty) is recorded. The non-empty sub-cubes continue to be partitioned into eight equal parts until leaf nodes obtained through partition are 1×1×1 unit cubes. In this process, the spatial correlation between the node and surrounding nodes is used to perform intra prediction to obtain the occupancy information. Finally, the context-based adaptive binary arithmetic coding (CABAC) is performed to generate a binary geometry bitstream.

However, in the prediction process, considering that some neighbour nodes of a parent node of the current node have little influence on the current node, using all 26 neighbours for prediction introduces too much computation, affecting prediction efficiency while increasing the computational complexity.

SUMMARY

In a first aspect, embodiments of the present application provide an intra prediction method. The intra prediction method is for an encoder and includes the following.

Coordinate information of a current node and a current level corresponding to the current node are determined. A current quantity is determined based on the current level, where the current quantity is positively correlated with the current level. Current neighbour nodes are determined based on the coordinate information of the current node, where the current neighbour nodes are neighbour nodes of the current quantity among neighbour nodes of a parent node of the current node. Intra prediction is performed on the current node based on the coordinate information of the current node and the current neighbour nodes.

In a second aspect, embodiments of the present application further provide an intra prediction method. The intra prediction method is for a decoder and includes the following.

Coordinate information of a current node and a current level corresponding to the current node are determined. A current quantity is determined based on the current level, where the current quantity is positively correlated with the current level. Current neighbour nodes are determined based on the coordinate information of the current node, where the current neighbour nodes are neighbour nodes of the current quantity among neighbour nodes of a parent node of the current node. Intra prediction is performed on the current node based on the coordinate information of the current node and the current neighbour nodes.

In a third aspect, embodiments of the present application provide a decoder. The decoder includes at least one processor and a memory. The memory is coupled to the at least one processor and stores at least one computer executable instruction thereon. When executed by the at least one processor, the at least one computer executable instruction causes the at least one processor to execute the method of the second aspect.

DETAILED DESCRIPTION

To better understand features and technical contents of embodiments of the present application, implementation of the embodiments of the present application will be described in detail below with reference to accompanying drawings.

In embodiments of this application, in an encoder framework of geometry-based point cloud compression (G-PCC) of point cloud, after a point cloud of an input three-dimensional picture model is partitioned into slices, each slice is encoded independently.

Figure 1:
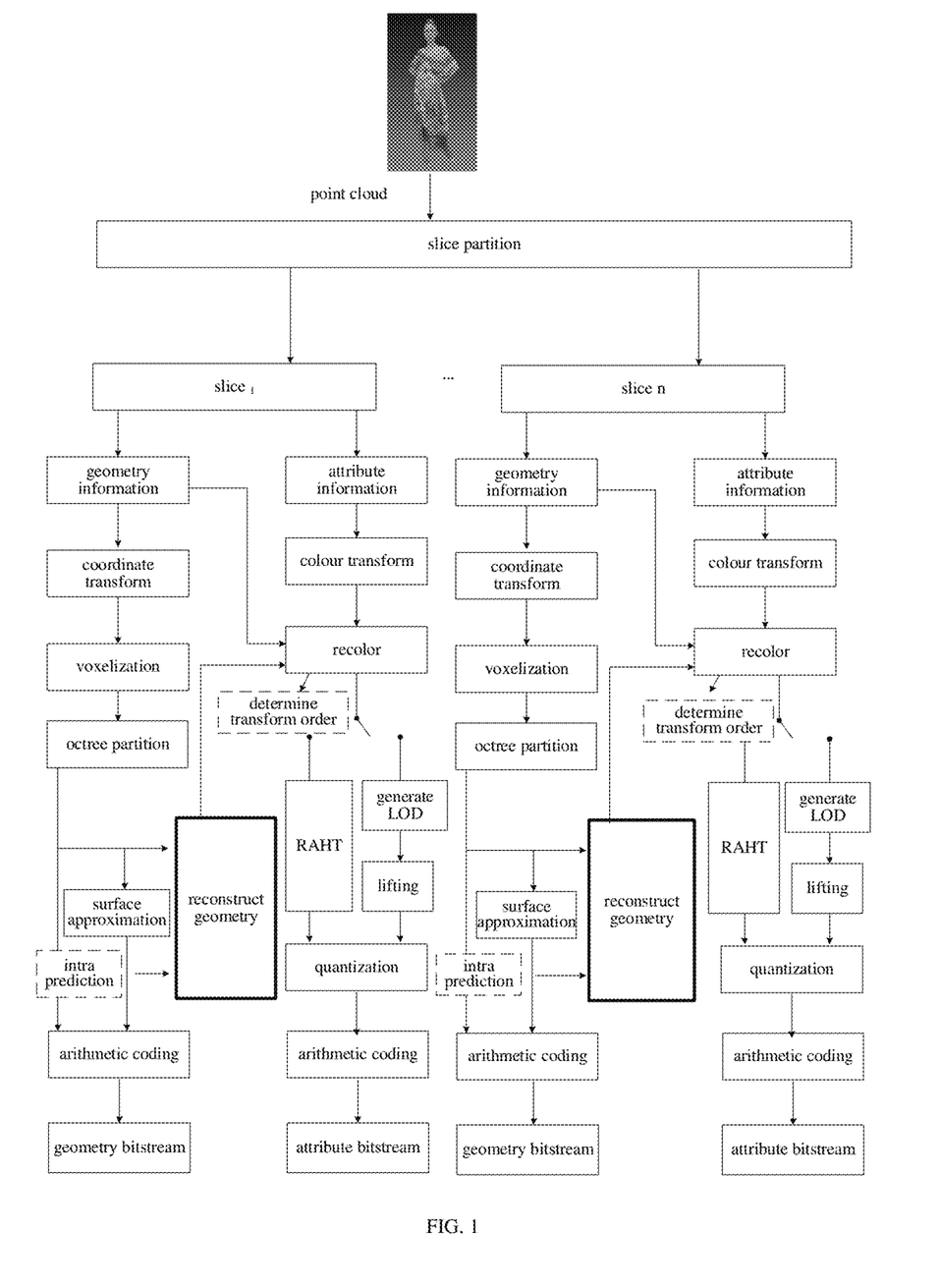
FIG. 1 is a block diagram of an exemplary encoding process provided in embodiments of the present application.

In a block diagram of a process of G-PCC encoding illustrated in FIG. 1, which is applied to a point cloud encoder. For point cloud data to-be-encoded, through slice partition, the point cloud data is first partitioned into multiple slices. For each slice, geometry information of the point cloud and attribute information corresponding to each point in the point cloud are encoded separately. In geometry encoding, coordinate transform is performed on the geometry information so that the whole point cloud is within a bounding box. Then, quantization is performed, which mainly plays a role of scaling. Due to the rounding of quantization, the geometry information of part of the point cloud is the same. Then whether to remove duplicate points is decided based on parameters. The process of quantizing and removing the duplicate points is also called voxelization. Thereafter, octree partition is performed on the bounding box. During octree-based geometry information encoding, the bounding box is equally partitioned into eight sub-cubes, and non-empty sub-cubes (containing a point(s) in the point cloud) continue to be partitioned into eight equal parts until leaf nodes obtained through partition are 1×1×1 unit cubes. Intra prediction is performed on points in the leaf nodes and arithmetic coding is performed on the points in the leaf nodes based on the intra prediction result to generate a binary geometry bitstream, that is, geometry code stream. During trisoup (triangle soup)-based geometry information encoding, octree partition is also performed first. Different from the octree-based geometry information encoding, for the trisoup, the point cloud does not need to be partitioned level by level into unit cubes each with an edge length of 1×1×1, but the partition is stopped when blocks each with an edge length of W are obtained. Based on a surface formed based on distribution of a point cloud in each block, at most twelve vertexes generated by both the surface and twelve edges of the block are obtained. Arithmetic coding is performed on the vertexes (surface approximation based on vertexes), to generate a binary geometry bitstream, that is, geometry code stream. The vertexes are also used in implementation of geometry reconstruction and reconstructed geometry information is used in attribute coding of the point cloud.

During attribute coding, after the geometry coding is completed and the geometry information is reconstructed, colour transform is performed, that is, colour information (i.e., the attribute information) is transformed from a RGB colour space to a YUV colour space. Thereafter, the reconstructed geometry information is used to recolour the point cloud, so that un-encoded attribute information can correspond to the reconstructed geometry information. During encoding of the colour information, there are mainly two transform methods. One is distance-based lifting transform which relies on level of detail (LOD) partition. The other is regional adaptive hierarchical transform (RAHT). Both methods transform the colour information from a spatial domain to a frequency domain, obtain high-frequency coefficients and low-frequency coefficients through transform, and finally quantize the coefficients (i.e., quantized coefficients). At last, geometry encoded data after octree partition and surface approximation and attribute encoded data after quantized coefficient processing are slice-synthesized, and vertex coordinates of each block are encoded in turn (that is, arithmetic coding), to generate a binary attribute bitstream, that is, attribute code stream.

Figure 2:
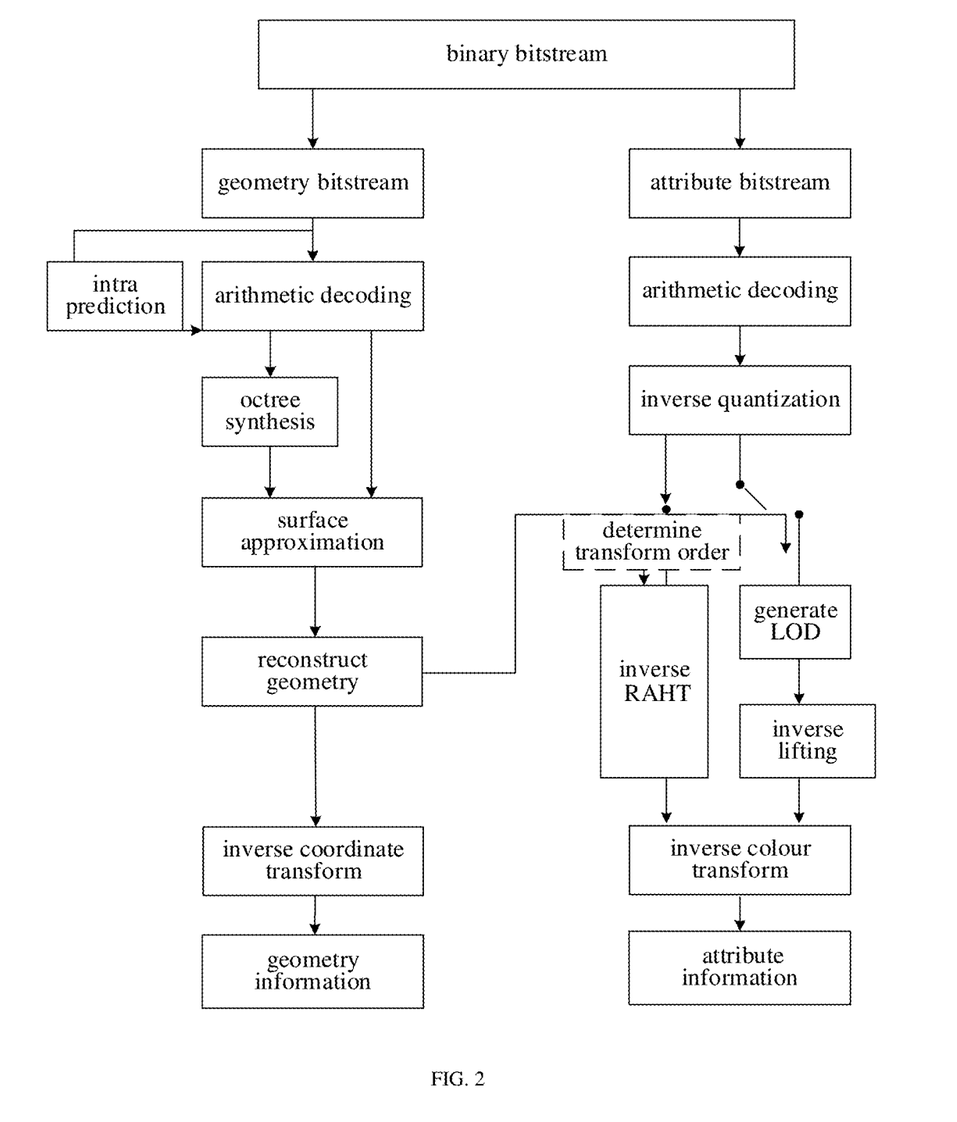
FIG. 2 is a block diagram of an exemplary decoding process provided in embodiments of the present application.

In a block diagram of a process of G-PCC decoding illustrated in FIG. 2, which is applied to a point cloud decoder. The decoder obtains the binary bitstream and independently decodes the geometry bitstream and the attribute bitstream in the binary bitstream. When decoding the geometry bitstream, the geometry information of the point cloud is obtained through arithmetic decoding-octree synthesis-surface approximation—reconstructing geometry—inverse coordinate transform. When decoding the attribute bitstream, the attribute information of the point cloud is obtained through arithmetic decoding-inverse quantization-LOD-based inverse lifting or RAHT-based inverse transform-inverse colour transform. The three-dimensional picture model of the point cloud data to-be-encoded is restored based on the geometry information and the attribute information.

An intra prediction method provided in embodiments of the present application is mainly applied to "intra prediction" in FIG. 1 and FIG. 2.

Based on the above background, the intra prediction method provided in embodiments of the present application is introduced below.

Figure 3:
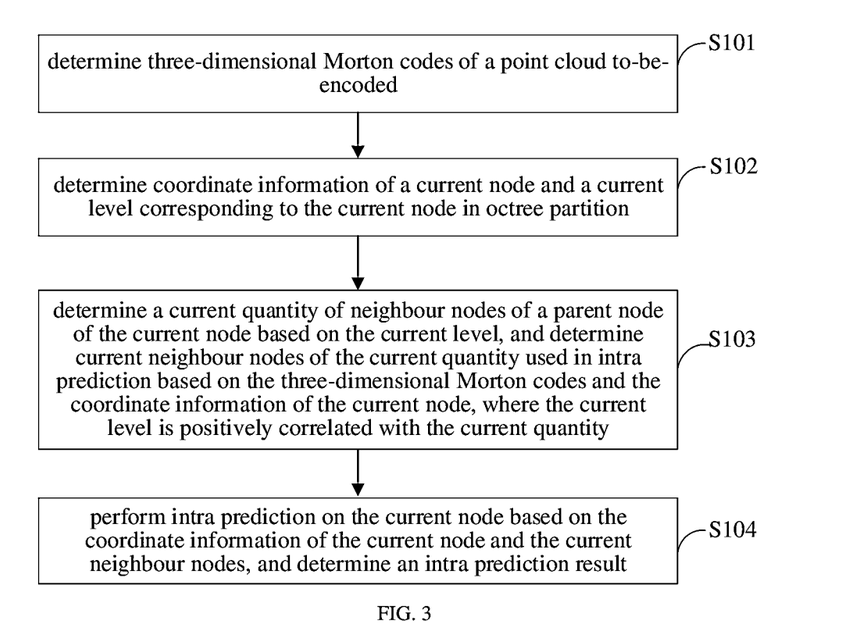
FIG. 3 is a flowchart of an intra prediction method provided in embodiments of the present application.

Embodiments of the present application provide an intra prediction method, which is applied to an encoder. As illustrated in FIG. 3, the method includes the following.

S101, three-dimensional Morton codes of a point cloud to-be-encoded are determined.

In embodiments of the present application, in the encoding process of a three-dimensional picture model, point cloud data of the three-dimensional picture model to-be-encoded in space is obtained, where the point cloud data may include geometry information and attribute information of the three-dimensional picture model. In the process of encoding the three-dimensional picture model, the geometry information of the point cloud and the attribute information corresponding to each point of the point cloud are encoded separately. The intra prediction in octree-based geometry information encoding in geometry information encoding is implemented by using the intra prediction method provided in the embodiments of the present application.

It should be noted that, when the encoder obtains the geometry information of the point cloud, the coordinate information of points can be used to obtain a Morton code corresponding to each point in the point cloud. The Morton code is also called z-order code, because its encoding order is in spatial z-order. Specifically, the method of calculating Morton code is described as follows. For three-dimensional coordinates with each component represented by a d-bit binary number, the three coordinate components are represented by the following formula:

$$x=\sum_{l=1}^{d} 2^{d-l} x_l, \ y=\sum_{l=1}^{d} 2^{d-l} y_l, \ z=\sum_{l=1}^{d} 2^{d-l} z_l.$$

$x_l, y_l, z_l \in \{0,1\}$ are respectively corresponding binary values from the most significant bits (l=1) to the least significant bits (l=d) of x, y, z. The Morton code M is obtained by interleaving $x_l$, $y_l$, $z_l$ from the most significant bits to the least significant bits for x, y, z. The calculation formula of M is illustrated in formula (1).

$$M=\sum_{l=1}^{d} 2^{3(d-l)}(4x_l+2y_l+z_l)=\sum_{l'=1}^{3d} 2^{3d-l'} m_{l'}, \quad (1)$$

$m_{l'} \in \{0,1\}$ is values from the most significant bit (l'=1) to the least significant bit (l'=3d) of M. After the Morton code M of each point in the point cloud is obtained, the points in the point cloud are sorted in an ascending order of the Morton codes, and a weight w of each point is set to be 1. It is represented as a computer language, similar to a combination of z (y<<1)|(x<<2).

As such, the encoder can determine the three-dimensional Morton codes of the point cloud data to-be-encoded.

S102, coordinate information of a current node and a current level corresponding to the current node are determined in octree partition.

Figure 4:
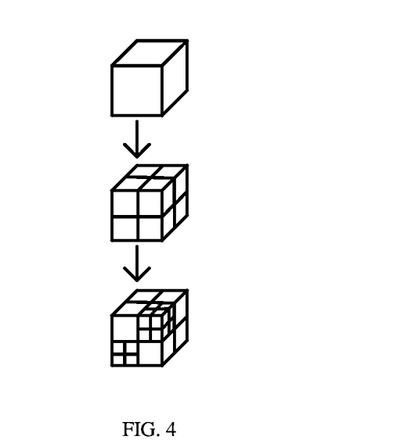
FIG. 4 is a schematic diagram 1 of exemplary octree partition provided in embodiments of the present application.
Figure 5:
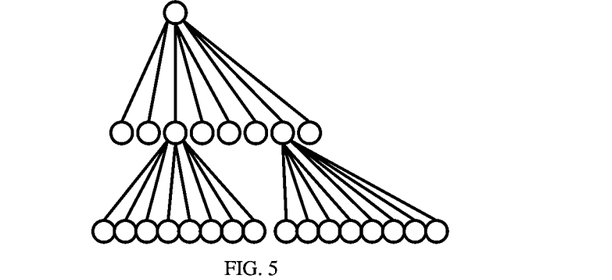
FIG. 5 is a schematic diagram 2 of exemplary octree partition provided in embodiments of the present application.

It should be noted that, for the point cloud data to-be-encoded, the encoder finds the maximum and minimum values $\{x_{max}, x_{min}\}$, $\{y_{max}, y_{min}\}$, and $\{z_{max}, z_{min}\}$ of coordinates corresponding to each coordinate component respectively in the three dimensions of x, y, and z to calculate $d=\text{ceil}(\log_2(\max\{\max\{x_{max}, y_{max}\}, z_{max}\}))$, where the ceil( ) function represents rounding up. Take $W=2^d$ as the side length of the cube bounding box and take the origin as the start point (lower left corner) to define the cube, such that all points in the point cloud are within the bounding box. Then, the encoder partitions the bounding box into 8 sub-cubes equally, as illustrated in FIG. 4, and the non-empty sub-cubes (containing a point(s) in the point cloud) continue to be partitioned into eight equal parts until leaf nodes obtained through partition are 1×1×1 unit cubes. The tree structure of the octree is illustrated in FIG. 5.

In embodiments of the present application, after performing slice partition, coordinate transform, and voxelization on the point cloud data to-be-encoded, the encoder proceeds to the process of octree partition. When performing octree partition, each level of the octree has at least one node. For a node, that is, the current node, based on the geometry information, the encoder can obtain the coordinate information of the current node in the partition process and obtain the current level of the current node. The "level" can be understood as a certain layer of a tree.

In embodiments of the present application, in the process of octree partition, the encoder can obtain the coordinate information of the current node and the current level corresponding to the current node in real time. There is only one node in the first level, and for each level other than the first level, nodes in the level are obtained by partitioning each node at a previous level into 8 nodes.

S103, a current quantity of neighbour nodes of a parent node of the current node is determined based on the current level, and current neighbour nodes of the current quantity used in intra prediction are determined based on the three-dimensional Morton codes and the coordinate information of the current node, where the current level is positively correlated with the current quantity.

After the encoder knows the current level of the current node, the encoder can determine the parent node at the previous level of the current node, and based on the parent node, the encoder can determine multiple current neighbour nodes adjacent to the parent node. The encoder can determine the quantity of neighbour nodes of the parent node to be used, i.e., the current quantity, based on the current level, i.e., the depth of the current node.

In embodiments of the present application, the encoder may determine the quantity of neighbour nodes used for the current node in intra prediction according to the actual depth of octree partition performed on the point cloud data.

It should be noted that, when the level of the current node is small, a small quantity or number of neighbour nodes can be used to accurately predict an occupancy state of the current node. The density of the points in the node gradually decreases with increase of the partition depth, and in this case, more neighbour nodes should be used to predict the occupancy state of the current node. Therefore, the encoder can determine the current quantity of the neighbour nodes of the parent node of the current node according to the current level. Then, based on the three-dimensional Morton codes and the coordinate information of the current node, the encoder determines, among all neighbour nodes of the parent node, the current neighbour nodes of the current quantity, where the current neighbour nodes are used in intra prediction of the current node. The current level is positively correlated with the current quantity, that is, the higher the current level, the greater the current quantity.

In embodiments of the present application, the encoder can determine the current neighbour nodes of the current quantity using the following two methods.

Method 1. The current quantity of the neighbour nodes of the parent node of the current node is determined to be a first preset quantity when the current level is greater than or equal to a preset prediction level and less than or equal to a preset level. First neighbour nodes of the first preset quantity adjacent to the current node among neighbour nodes of the parent node of the current node are determined according to the three-dimensional Morton codes, a preset shift parameter, and the coordinate information of the current node. The current quantity of the neighbour nodes of the parent node of the current node is determined to be a second preset quantity when the current level is greater than the preset level. Second neighbour nodes of the second preset quantity of the parent node of the current node are determined according to the three-dimensional Morton codes, the preset shift parameter, and the coordinate information of the current node. The first preset quantity is less than the second preset quantity, and the current neighbour nodes are the first neighbour nodes or the second neighbour nodes.

In embodiments of the present application, the encoder enables intra prediction when the octree partition reaches the preset prediction level. That is, during octree partition, the encoder starts intra prediction only when the partition reaches the preset prediction level. For example, the preset prediction level is the preset level L. Alternatively, intra prediction is enabled for a node with a depth of $2^6$, etc., which is not limited in the embodiments of the present application.

In embodiments of the present application, after the encoder starts intra prediction, if the current level is less than or equal to the preset level, since the current level represents a small depth of the current node, the encoder determines that the current quantity of the neighbour nodes of the parent node of the current node is the first preset quantity. Then, according to the three-dimensional Morton codes and the preset shift parameter along with the coordinate information of the current node, the encoder can determine neighbour nodes of the parent node of the current node. Then, the encoder determines first neighbour nodes of the first preset quantity adjacent to the current node from 26 neighbour nodes. When the current level is greater than the preset level, the encoder determines that the current quantity of the neighbour nodes of the parent node of the current node is the second preset quantity, where the first preset quantity is smaller than the second preset quantity. The encoder may determine the second neighbour nodes of the second preset quantity from neighbour nodes of the parent node of the current node, according to the three-dimensional Morton codes, the preset shift parameter, and the coordinate information of the current node. The encoder takes the first neighbour nodes or the second neighbour nodes as the current neighbour nodes.

In embodiments of the present application, the first preset quantity may be 6 and the second preset quantity may be 26. The specific values of the first preset quantity and the second preset quantity are not limited in the embodiments of the present application, as long as the first preset quantity is less than the second preset quantity and the first preset quantity and the second preset quantity do not exceed 26.

Exemplarily, the current level is L and the preset level is L0. When L<=L0, 6 current neighbour nodes sharing a same edge and a same face with the current node are used to perform intra prediction on the current node. When L>L0, all 26 neighbour nodes are used to perform intra prediction on the current node.

In some embodiments of the present application, based on the current level, the encoder may classify levels of current nodes that satisfy the preset prediction level into different grades or use multiple different preset levels, and determine multiple neighbour nodes of the preset quantity based on the grades or the preset levels, to perform intra prediction on the current node. In embodiments of the present application, the levels are exemplarily classified into two grades, but grades of the levels are not limited in the embodiments of the present application.

It can be understood that, the encoder uses less neighbour node information to perform intra prediction in the initial stage of octree partition, which not only reduces the computational complexity, but also improves the accuracy and efficiency of prediction.

Method 2. A density of points in each neighbour node of the parent node of the current node is determined based on the current level, the three-dimensional Morton codes, and the coordinate information of the current node when the current level is greater than or equal to a preset prediction level. The current neighbour nodes of the current quantity is determined based on the density of the points. The density of the points is negatively correlated with the current quantity.

In embodiments of the present application, when the current level is greater than or equal to the preset prediction level, intra prediction is started. The encoder can determine each neighbour node of the parent node of the current node based on the current level, the three-dimensional Morton codes, and the coordinate information of the current node, and determine the density of points in each neighbour node. Based on the density of points, the encoder determines the current quantity of the current node, and then finds the current neighbour nodes of the current quantity from neighbour nodes of the parent node of the current node.

It should be noted that, the density of the points is negatively correlated with the current quantity. That is, as the level of the octree increases, the density of points in each neighbour node of the parent node of the current node decreases, and the current quantity also increases.

In embodiments of the present application, the encoder can set a preset density threshold. When the preset density threshold is not exceeded, the current quantity is the second preset quantity; when the current preset density threshold is exceeded, the current quantity is the first preset quantity. Alternatively, when the current level does not exceed the preset level, neighbour nodes of a third preset quantity with the highest density in all neighbour nodes of the parent node are selected as the current neighbour nodes; when the current level exceeds the preset level, neighbour nodes of a fourth preset quantity with the highest density of points in all neighbour nodes of the parent node are selected as the current neighbour nodes. The third preset quantity is smaller than the fourth preset quantity, and neither the third preset quantity nor the fourth preset quantity exceeds 26. For example, the third preset quantity is 6 and the fourth preset quantity is 26, which is not limited in the embodiment of the present application.

It can be understood that, the encoder uses less neighbour node information to perform intra prediction in the initial stage of octree partition, which not only reduces the computational complexity, but also improves the accuracy and efficiency of prediction.

In some embodiments of the present application, the encoder determines the current neighbour nodes as follows. The encoder can determine coordinate information and occupancy information of the current neighbour nodes of the current quantity used in intra prediction based on the three-dimensional Morton codes, the preset shift parameter, and the coordinate information of the current node. As such, the encoder can perform intra prediction based on the coordinate information and occupancy information of the current neighbour nodes.

The occupancy information is used to represent whether there is point cloud distribution in the current neighbour node. The occupancy information can be represented by a binary number. For example, 0 means "empty", that is, there is no point cloud distribution, and 1 means "non-empty", that is, there is point cloud distribution.

S104, intra prediction is performed on the current node based on the coordinate information of the current node and the current neighbour nodes, and an intra prediction result is determined.

After determining the current neighbour nodes of the current quantity, the encoder can perform intra prediction on the current node according to the coordinate information of the current node and the current neighbour nodes of the current quantity, and determine the intra prediction result.

In some embodiments of the present application, the encoder determines node distances between the current node and the current neighbour nodes based on the coordinate information of the current node and the coordinate information of the current neighbour nodes, determines, from a preset weight table, weights of the current neighbour nodes based on the node distances and the occupancy information, determines an average weight of the current neighbour nodes of the current quantity based on the weights of the current neighbour nodes, and performs intra prediction on the current node based on the average weight and determines the intra prediction result.

In embodiments of the present application, the encoder can determine the coordinate information of the current neighbour nodes of the current quantity and the occupancy information of the current neighbour nodes used in intra prediction based on the three-dimensional Morton codes, the preset shift parameter, and the coordinate information of the current node. Then, the encoder determines the node distances between the current node and the current neighbour nodes based on the coordinate information of the current node and the coordinate information of the current neighbour nodes. The encoder determines, from the preset weight table, the weight of each current neighbour node based on the node distance corresponding to each current neighbour node and the occupancy information of each current neighbour node. Then, the encoder averages the determined weights of the current neighbour nodes to obtain the average weight, and performs intra prediction on the current node based on the average weight and determines the intra prediction result.

It should be noted that, the node distance from each current neighbour node to the current node, the weight when the occupancy information of the current neighbour node is 0, and the weight when the occupancy information is 1 are set in the preset weight table. Therefore, the encoder can determine the weight of each current neighbour node from the preset weight table based on the node distance corresponding to each current neighbour node and the occupancy information of each current neighbour node.

It should be noted that, the preset weight table when the current quantity is the first preset quantity is different from the preset weight table when the current quantity is the second preset quantity. That is, the preset weight table includes a first preset weight table and a second preset weight table. The first preset weight table is different from the second preset weight table, and the weights in the table are trained.

Exemplarily, the current quantity is H, the current neighbour node is k, and the occupancy information is $\delta(k)$, where k is a value in [0, H], H is less than or equal to 25, $\delta$ is 0 or 1, and the node distance from each current neighbour node to the current node is $d_{k,m}$.

As such, the weight $w_{k,m}(\delta_k)$ is obtained through formula (2):

$$w_{k,m}(\delta_k) = W(d_{k,m}, \delta_k) = \begin{cases} W0(d_{k,m}), \delta_k = 0 \\ W1(d_{k,m}), \delta_k = 1 \end{cases}. \quad (2)$$

$W0(d_{k,m})$ and $W1(d_{k,m})$ are obtained through training.

Exemplarily, the average weight $score_m$ is obtained through formula (3):

$$score_m = \frac{1}{H} \sum_{k=1}^{H} w_{k,m}(\delta_k). \quad (3)$$

It should be noted that, in the case that the first preset quantity is 6, H is equal to 6.

In the case that the first preset quantity is 26, H is equal to 26.

In embodiments of the present application, the encoder performs intra prediction on the current node based on the average weight and determines the intra prediction result as follows. The encoder performs intra prediction on the current node and determines that the intra prediction result is "occupied", when the average weight is greater than an upper weight threshold, performs intra prediction on the current node and determines that the intra prediction result is "non-occupied", when the average weight is less than a lower weight threshold, and determines that the intra prediction result is "not predicted" when the average weight is less than or equal to the upper weight threshold and greater than or equal to the lower weight threshold. The upper weight threshold includes a first upper weight threshold and a second upper weight threshold, the lower weight threshold includes a first lower weight threshold and a second lower weight threshold, the first upper weight threshold and the first lower weight threshold correspond to the first neighbour nodes, and the second upper weight threshold and the second lower weight threshold correspond to the second neighbour nodes.

In embodiments of the present application, when the current level is greater than or equal to the preset prediction level and less than or equal to the preset level, the encoder calculates a first average weight of weights of the first preset quantity. If the first average weight is greater than the first upper weight threshold, the encoder performs intra prediction on the current node, and determines that the intra prediction result is "occupied". If the first average weight is less than the first lower weight threshold, the encoder performs intra prediction on the current node, and determines that the intra prediction result is "non-occupied". If the first average weight is less than or equal to the first upper weight threshold and greater than or equal to the first lower weight threshold, the intra prediction result is "not predicted". When the current level is greater than the preset level, the encoder calculates a second average weight of weights of the second preset quantity, if the second average weight is greater than the second upper weight threshold, the encoder performs intra prediction on the current node, and determines that the intra prediction result is "occupied"; if the second average weight is less than the second lower weight threshold, the encoder performs intra prediction on the current node, and determines that the intra prediction result is "non-occupied"; if the second average weight is less than or equal to the second upper weight threshold and greater than or equal to the second lower weight threshold, the intra prediction result is "not predicted".

It should be noted that, the first upper weight threshold, the second upper weight threshold, the first lower weight threshold, and the second lower weight threshold are all obtained through training. In addition, the first upper weight threshold and the second upper weight threshold are different, and the first lower weight threshold and the second lower weight threshold are different.

In embodiments of the present application, the intra prediction result may be represented by a binary number. For example, "predicted or not" and "prediction value" represented by 0 and/or 1 are used in the subsequent arithmetic coding of the occupancy information. "1, 1" represent "occupied"; "1, 0" represent "non-occupied"; and "0, 0" represent "not predicted".

Exemplarily, it is assumed that the first lower weight threshold is $th_0(No)$ and the first upper weight threshold is $th_1(No)$, and the first average weight is $score_m$. When $score_m$ is less than $th_0(No)$, the intra prediction result of the current node is "not occupied". When $score_m$ is greater than $th_1(No)$, the intra prediction result of the current node is "occupied". When $score_m$ is between $th_0(No)$ and $th_1(No)$, the intra prediction result of the current node is "not predicted".

It should be noted that, values of $w_0(d_{k,m})$, $w_1(d_{k,m})$, $th_0(No)$, and $th_1(No)$ are all obtained through training, and are preset fixed values in the encoder and the decoder, which do not need to be transmitted from the encoder to the decoder. For better prediction effect, the weights and thresholds in the original prediction method adopting 26 neighbours also need to be retrained, for better performance.

In some embodiments of the present application, after obtaining the intra prediction result of the current node, the encoder continues to perform intra prediction on the next node until the last node is predicted, that is, the octree partition is completed. Then, the encoder can start to perform CABAC based on the intra prediction result, and then obtain the binary geometry bitstream.

It can be understood that, the encoder uses less neighbour node information to perform intra prediction in the initial stage of octree partition, which improves the accuracy and efficiency of prediction while reducing the computational complexity. As such, the intra prediction result of the octree-based geometry information encoding is more suitable for entropy coding, thereby saving the bitstream and improving the performance.

The above effect is described below through experimental data.

TABLE 1

| Point cloud sequence | Coded bitstream Prior art | Coded bitstream Solution of the present application | Comparison result |
|---|---|---|---|
| basketball | 2601600 | 2580768 | 99.20% |
| boxer | 12867152 | 12853016 | 99.89% |
| dancer | 2284656 | 2266904 | 99.22% |
| longdress | 885088 | 879024 | 99.31% |
| loot | 796744 | 792104 | 99.42% |
| queen | 783432 | 775864 | 99.03% |
| redandblack | 845208 | 840400 | 99.43% |
| soldier | 1138496 | 1132016 | 99.43% |
| thaidancer | 3488896 | 3474328 | 99.58% |
| Average | — | — | 99.39% |

It can be seen from Table 1 that, in the case of lossless compression, for different point cloud sequences, when arithmetic coding is performed using the prior art and the method of the present application, the coded bitstream obtained through arithmetic coding when using the intra prediction method provided in the embodiment of the present application is slightly more than 99% of the coded bitstream obtained through coding when using the prior art. That is, 1-99.39%=0.61% of the bitstream is saved on average, and thus the encoded bitstream is reduced.

TABLE 2

| Point cloud sequence | Geometry BD-TotalRate(%) | |
|---|---|---|
| | D1 point-to-point | D2 point-to-surface |
| basketball | -0.9% | -0.9% |
| boxer | -0.6% | -0.6% |
| dancer | -1.0% | -16.6% |
| longdress | -1.1% | -1.1% |
| loot | -0.7% | -0.7% |
| queen | -1.0% | -1.0% |
| redandblack | -0.9% | -0.9% |
| soldier | -0.9% | -0.9% |
| thaidancer | -0.9% | -1.0% |
| Average | -0.9% | -2.6% |

It can be seen from Table 2 that, in the case of lossy compression, for different point cloud sequences, compared with the method in the prior art, in the intra prediction method provided in the present application, the BD-Rate increase is an average increase of point-to-point −0.9%, and is an average increase of point-to-surface −2.6%.

It should be noted that, the smaller value of BD-TotalRate % represents the greater gain, thus improving the encoding accuracy.

Figure 6:
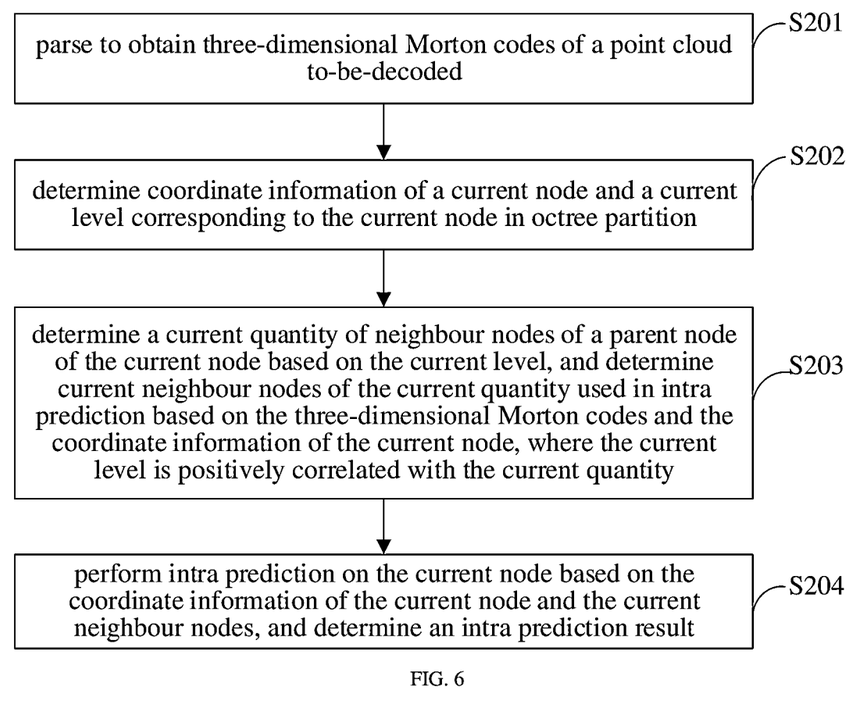
FIG. 6 is a flowchart of an intra prediction method further provided in embodiments of the present application.

Embodiments of the present application provide an intra prediction method, which is applied to a decoder. As illustrated in FIG. 6, the method includes the following.

At S201, parse to obtain three-dimensional Morton codes of a point cloud to-be-decoded.

In embodiments of the present application, when decoding the geometry bitstream, the decoder can parse the arithmetic code to obtain the three-dimensional Morton codes of the point cloud to-be-decoded, etc.

At S202, coordinate information of a current node and a current level corresponding to the current node are determined in octree synthesis.

In embodiments of the present application, in the process of octree synthesis, the decoder can obtain the coordinate information of the current node and the current level corresponding to the current node in real time. There is only one node in the first level, and for each level other than the first level, nodes in the level are obtained by partitioning each node at a previous level into 8 nodes.

The process of performing the octree synthesis by the decoder is the same as that described in S202 at the encoder side, and details are not repeated herein.

The difference is that the decoder parses the bitstream to obtain information such as a preset quantity level, and then starts to perform octree synthesis based on the preset quantity level, and performs arithmetic decoding after the synthesis is completed. The preset quantity level is less than or equal to a preset prediction level.

At S203, a current quantity of neighbour nodes of a parent node of the current node is determined based on the current level, and current neighbour nodes of the current quantity used in intra prediction are determined based on the three-dimensional Morton codes and the coordinate information of the current node, where the current level is positively correlated with the current quantity.

The decoder can determine a current quantity of neighbour nodes of a parent node of the current node based on the current level, and determine current neighbour nodes of the current quantity used in intra prediction based on the three-dimensional Morton codes and the coordinate information of the current node, which has the same principle as S103 implemented by the encoder. The details will not be repeated herein.

In embodiments of the present application, the decoder can determine the current neighbour nodes of the current quantity using the following two methods.

Method 1. The current quantity of the neighbour nodes of the parent node of the current node is determined to be a first preset quantity when the current level is greater than or equal to a preset prediction level and less than or equal to a preset level. First neighbour nodes of the first preset quantity adjacent to the current node among neighbour nodes of the parent node of the current node are determined according to the three-dimensional Morton codes, a preset shift parameter, and the coordinate information of the current node. The current quantity of the neighbour nodes of the parent node of the current node is determined to be a second preset quantity when the current level is greater than the preset level. Second neighbour nodes of the second preset quantity of the parent node of the current node are determined according to the three-dimensional Morton codes, the preset shift parameter, and the coordinate information of the current node. The first preset quantity is less than the second preset quantity, and the current neighbour nodes are the first neighbour nodes or the second neighbour nodes.

In embodiments of the present application, the first preset quantity may be 6 and the second preset quantity may be 26. The specific values of the first preset quantity and the second preset quantity are not limited in the embodiments of the present application, as long as the first preset quantity is less than the second preset quantity and the first preset quantity and the second preset quantity do not exceed 26.

Method 2. A density of points in each neighbour node of the parent node of the current node is determined based on the current level, the three-dimensional Morton codes, and the coordinate information of the current node when the current level is greater than or equal to a preset prediction level. The current neighbour nodes of the current quantity is determined based on the density of the points. The density of the points is negatively correlated with the current quantity.

It can be understood that, the decoder uses less neighbour node information to perform intra prediction in the initial stage of octree partition, which not only reduces the computational complexity, but also improves the accuracy and efficiency of prediction.

In some embodiments of the present application, the decoder determines the current neighbour nodes as follows. The decoder can determine coordinate information and occupancy information of the current neighbour nodes of the current quantity used in intra prediction based on the three-dimensional Morton codes, the preset shift parameter, and the coordinate information of the current node. As such, the decoder can perform intra prediction based on the coordinate information and occupancy information of the current neighbour nodes.

At S204, intra prediction is performed on the current node based on the coordinate information of the current node and the current neighbour nodes, and an intra prediction result is determined.

The decoder can perform intra prediction on the current node based on the coordinate information of the current node and the current neighbour nodes, and determine the intra prediction result, which has the same principle as S104 implemented by the encoder. The details will not be repeated herein.

It should be noted that, in some embodiments of the present application, the decoder determines node distances between the current node and the current neighbour nodes based on the coordinate information of the current node and the coordinate information of the current neighbour nodes, determines, from a preset weight table, weights of the current neighbour nodes based on the node distances and the occupancy information, determines an average weight of the current neighbour nodes of the current quantity based on the weights of the current neighbour nodes, and performs intra prediction on the current node based on the average weight and determines the intra prediction result.

In some embodiments of the present application, the decoder performs intra prediction on the current node and determines that the intra prediction result is "occupied", when the average weight is greater than an upper weight threshold, performs intra prediction on the current node and determines that the intra prediction result is "non-occupied", when the average weight is less than a lower weight threshold, and determines that the intra prediction result is "not predicted" when the average weight is less than or equal to the upper weight threshold and greater than or equal to the lower weight threshold. The upper weight threshold includes a first upper weight threshold and a second upper weight threshold, the lower weight threshold includes a first lower weight threshold and a second lower weight threshold, the first upper weight threshold and the first lower weight threshold correspond to the first neighbour nodes, and the second upper weight threshold and the second lower weight threshold correspond to the second neighbour nodes.

It can be understood that, the decoder uses less neighbour node information to perform intra prediction in the initial stage of octree partition, which not only reduces the computational complexity, but also improves the accuracy and efficiency of prediction.

Figure 7:
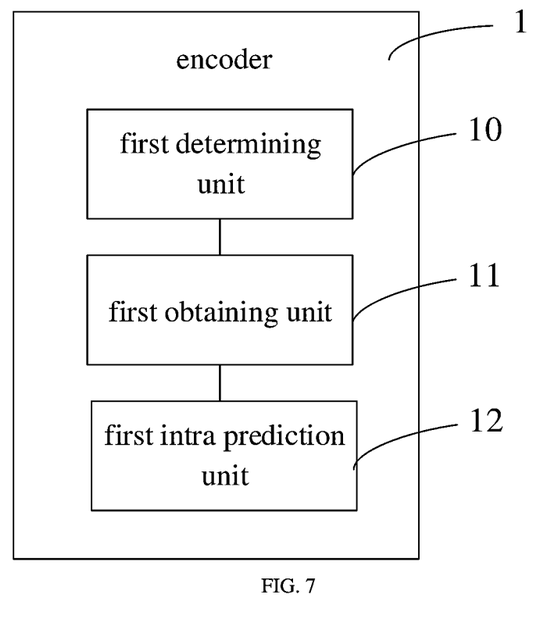
FIG. 7 is a schematic structural diagram 1 of an encoder provided in embodiments of the present application.

Based on the implementation basis of the foregoing embodiments, as illustrated in FIG. 7, embodiments of the present application provide an encoder 1. The encoder 1 includes a first determining unit 10, a first obtaining unit 11, and a first intra prediction unit 12.

The first determining unit 10 is configured to determine three-dimensional Morton codes of a point cloud to-be-encoded. The first obtaining unit 11 is configured to determine, in octree partition, coordinate information of a current node and a current level corresponding to the current node. The first determining unit 10 is further configured to determine a current quantity of neighbour nodes of a parent node of the current node based on the current level, and determine current neighbour nodes of the current quantity used in intra prediction based on the three-dimensional Morton codes and the coordinate information of the current node, where the current level is positively correlated with the current quantity. The first intra prediction unit 12 is configured to perform intra prediction on the current node based on the coordinate information of the current node and the current neighbour nodes, and determine an intra prediction result.

In some embodiments of the present application, the first determining unit 10 is further configured to: determine the current quantity of the neighbour nodes of the parent node of the current node to be a first preset quantity when the current level is greater than or equal to a preset prediction level and less than or equal to a preset level; determine first neighbour nodes of the first preset quantity adjacent to the current node among neighbour nodes of the parent node of the current node, according to the three-dimensional Morton codes, a preset shift parameter, and the coordinate information of the current node; determine the current quantity of the neighbour nodes of the parent node of the current node to be a second preset quantity when the current level is greater than the preset level; and determine second neighbour nodes of the second preset quantity of the parent node of the current node, according to the three-dimensional Morton codes, the preset shift parameter, and the coordinate information of the current node, where the first preset quantity is less than the second preset quantity, and the current neighbour nodes are the first neighbour nodes or the second neighbour nodes.

In some embodiments of the present application, the first determining unit 10 is further configured to: determine a density of points in each neighbour node of the parent node of the current node based on the current level, the three-dimensional Morton codes, and the coordinate information of the current node when the current level is greater than or equal to a preset prediction level; and determine the current neighbour nodes of the current quantity based on the density of the points, where the density of the points is negatively correlated with the current quantity.

In some embodiments of the present application, the first determining unit 10 is further configured to: determine coordinate information and occupancy information of the current neighbour nodes of the current quantity used in intra prediction based on the three-dimensional Morton codes, the preset shift parameter, and the coordinate information of the current node.

In some embodiments of the present application, the first intra prediction unit 12 is further configured to: determine node distances between the current node and the current neighbour nodes based on the coordinate information of the current node and the coordinate information of the current neighbour nodes; determine, from a preset weight table, weights of the current neighbour nodes based on the node distances and the occupancy information; determine an average weight of the current neighbour nodes of the current quantity based on the weights of the current neighbour nodes; and perform intra prediction on the current node based on the average weight and determine the intra prediction result.

In some embodiments of the present application, the first intra prediction unit 12 is further configured to: perform intra prediction on the current node and determines that the intra prediction result is "occupied", when the average weight is greater than an upper weight threshold; perform intra prediction on the current node and determines that the intra prediction result is "non-occupied", when the average weight is less than a lower weight threshold; and determine that the intra prediction result is "not predicted" when the average weight is less than or equal to the upper weight threshold and greater than or equal to the lower weight threshold, where the upper weight threshold includes a first upper weight threshold and a second upper weight threshold, the lower weight threshold includes a first lower weight threshold and a second lower weight threshold, the first upper weight threshold and the first lower weight threshold correspond to the first neighbour nodes, and the second upper weight threshold and the second lower weight threshold correspond to the second neighbour nodes.

In some embodiments of the present application, the first preset quantity is 6 and the second preset quantity is 26.

It can be understood that, the encoder uses less neighbour node information to perform intra prediction in the initial stage of octree partition, which not only reduces the computational complexity, but also improves the accuracy and efficiency of prediction.

Figure 8:
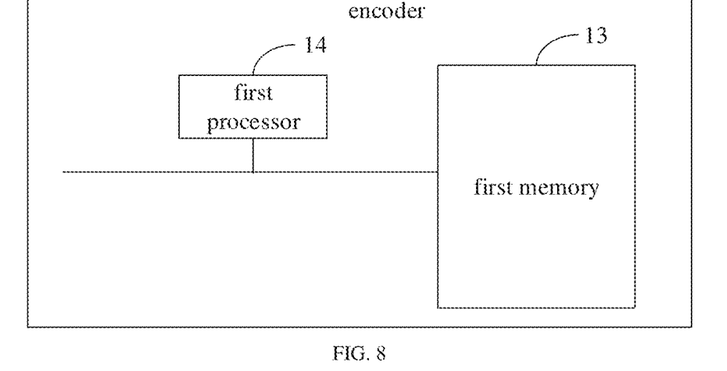
FIG. 8 is a schematic structural diagram 2 of an encoder provided in embodiments of the present application.

In practical application, as illustrated in FIG. 8, embodiments of the present application further provide an encoder. The encoder includes a first memory 13 and a first processor 14.

The first memory 13 is configured to store executable instructions. The first processor 14 is configured to implement the intra prediction method at the encoder side when executing the executable instructions stored in the first memory 13.

The processor can be implemented by software, hardware, firmware, or a combination thereof. The processor can use circuits, single or multiple application specific integrated circuits (ASIC), single or multiple general integrated circuits, single or multiple microprocessors, single or multiple programmable logic devices, or a combination of the foregoing circuits or devices, or other suitable circuits or devices. Thereby, the processor can execute corresponding steps of the intra prediction method in the aforementioned embodiments.

Figure 9:
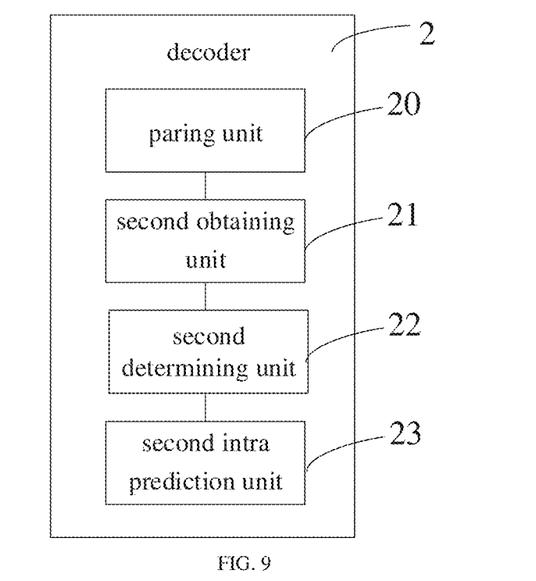
FIG. 9 is a schematic structural diagram 1 of a decoder provided in embodiments of the present application.

Based on the implementation basis of the foregoing embodiments, as illustrated in FIG. 9, embodiments of the present application provide a decoder 2. The decoder 2 includes a paring unit 20, a second obtaining unit 21, a second determining unit 22, and a second intra prediction unit 23.

The paring unit 20 is configured to parse to obtain three-dimensional Morton codes of a point cloud to-be-decoded. The second obtaining unit 21 is configured to determine, in octree synthesis, coordinate information of a current node and a current level corresponding to the current node. The second determining unit 22 is configured to determine a current quantity of neighbour nodes of a parent node of the current node based on the current level, and determine current neighbour nodes of the current quantity used in intra prediction based on the three-dimensional Morton codes and the coordinate information of the current node, where the current level is positively correlated with the current quantity. The second intra prediction unit 23 is configured to perform intra prediction on the current node based on the coordinate information of the current node and the current neighbour nodes, and determine an intra prediction result.

In some embodiments of the present application, the second determining unit 22 is further configured to: determining the current quantity of the neighbour nodes of the parent node of the current node to be a first preset quantity when the current level is greater than or equal to a preset prediction level and less than or equal to a preset level; determine first neighbour nodes of the first preset quantity adjacent to the current node among neighbour nodes of the parent node of the current node, according to the three-dimensional Morton codes, a preset shift parameter, and the coordinate information of the current node; determine the current quantity of the neighbour nodes of the parent node of the current node to be a second preset quantity when the current level is greater than the preset level; and determine second neighbour nodes of the second preset quantity of the parent node of the current node, according to the three-dimensional Morton codes, the preset shift parameter, and the coordinate information of the current node, where the first preset quantity is less than the second preset quantity, and the current neighbour nodes are the first neighbour nodes or the second neighbour nodes.

In some embodiments of the present application, the second determining unit 22 is further configured to: determine a density of points in each neighbour node of the parent node of the current node based on the current level, the three-dimensional Morton codes, and the coordinate information of the current node when the current level is greater than or equal to a preset prediction level; and determine the current neighbour nodes of the current quantity based on the density of the points, where the density of the points is negatively correlated with the current quantity.

In some embodiments of the present application, the second determining unit 22 is further configured to: determine coordinate information and occupancy information of the current neighbour nodes of the current quantity used in intra prediction based on the three-dimensional Morton codes, the preset shift parameter, and the coordinate information of the current node.

In some embodiments of the present application, the second intra prediction unit 23 is further configured to: determine node distances between the current node and the current neighbour nodes based on the coordinate information of the current node and the coordinate information of the current neighbour nodes; determine, from a preset weight table, weights of the current neighbour nodes based on the node distances and the occupancy information; determine an average weight of the current neighbour nodes of the current quantity based on the weights of the current neighbour nodes; and perform intra prediction on the current node based on the average weight and determine the intra prediction result.

In some embodiments of the present application, the second intra prediction unit 23 is further configured to: perform intra prediction on the current node and determine that the intra prediction result is "occupied", when the average weight is greater than an upper weight threshold; perform intra prediction on the current node and determine that the intra prediction result is "non-occupied", when the average weight is less than a lower weight threshold; and determine that the intra prediction result is "not predicted" when the average weight is less than or equal to the upper weight threshold and greater than or equal to the lower weight threshold, where the upper weight threshold includes a first upper weight threshold and a second upper weight threshold, the lower weight threshold includes a first lower weight threshold and a second lower weight threshold, the first upper weight threshold and the first lower weight threshold correspond to the first neighbour nodes, and the second upper weight threshold and the second lower weight threshold correspond to the second neighbour nodes.

In some embodiments of the present application, the first preset quantity is 6 and the second preset quantity is 26.

It can be understood that, the decoder uses less neighbour node information to perform intra prediction in the initial stage of octree partition, which not only reduces the computational complexity, but also improves the accuracy and efficiency of prediction.

Figure 10:
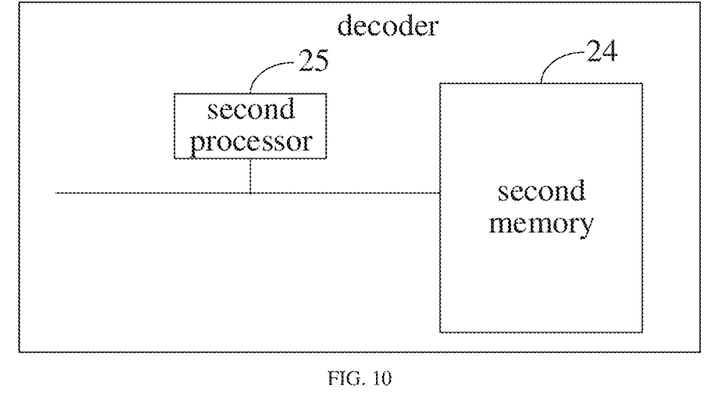
FIG. 10 is a schematic structural diagram 2 of a decoder provided in embodiments of the present application.

In practical application, as illustrated in FIG. 10, embodiments of the present application further provide a decoder. The decoder includes a second memory 24 and a second processor 25.

The second memory 24 is configured to store executable instructions. The second processor 25 is configured to implement the intra prediction method at the decoder side when executing the executable instructions stored in the second memory 24.

Embodiments of the present application provide a storage medium. The storage medium stores executable instructions and is configured to cause a first processor to implement the intra prediction method at the encoder side or cause a second processor to implement the intra prediction method at the decoder side.

In the embodiments of the present application, the various components may be integrated into one processing unit, or each unit may be physically present, or two or more units may be integrated into one unit. The above-mentioned integrated unit can be implemented in the form of hardware or a software function module.

The integrated unit may be stored in a computer readable storage medium if implemented in the form of a software functional unit and is sold or used as a separate product. Based on such understanding, the technical solutions in essential or the part of the technical solutions that contributes to the prior art of this embodiment, or all or part of the technical solutions, may be embodied in the form of a software product. The computer software product is stored in a storage medium and includes instructions for causing a computer device (which may be a personal computer, a server, or a network device and the like) or a processor to perform all or part of the steps described in this embodiment. The above storage medium includes various media that can store program codes, such as ferromagnetic random access memory (FRAM), read-only memory (ROM), programmable read-only memory (PROM), erasable programmable read-only memory (EPROM), electrically erasable programmable read-only memory (EEPROM), flash memory, magnetic surface memory, an optical disc, or CD-ROM, compact disc read-only memory, which is not limited in the embodiments of the present application.

INDUSTRIAL APPLICABILITY

The intra prediction method, the encoder, the decoder, and the storage medium are provided in embodiments of the present application. The method includes the following. The three-dimensional Morton codes of the point cloud to-be-encoded are determined. The coordinate information of the current node and the current level corresponding to the current node are determined when octree partition is performed. The current quantity of the neighbour nodes of the parent node of the current node is determined based on the current level, and the current neighbour nodes of the current quantity used in intra prediction are determined based on the three-dimensional Morton codes and the coordinate information of the current node, where the current level is positively correlated with the current quantity. The intra prediction is performed on the current node based on the coordinate information of the current node and the current neighbour nodes, and the intra prediction result is determined. In the initial stage of octree partition, less neighbour node information is used to perform intra prediction, which not only reduces the computational complexity, but also improves the accuracy and efficiency of prediction.

What is claimed is:

1. An intra prediction method, for an encoder and comprising:
    determining coordinate information of a current node and a current level corresponding to the current node;
    determining a current quantity of current neighbour nodes used in intra prediction on the current node based on the current level, wherein the current quantity is positively correlated with the current level, and the current neighbour nodes belongs to neighbour nodes of a parent node of the current node;
    determining the current neighbour nodes based on the coordinate information of the current node; and
    performing intra prediction on the current node based on the coordinate information of the current node and the current neighbour nodes.

2. The method of claim 1, wherein determining the current quantity based on the current level, and determining the current neighbour nodes based on the coordinate information of the current node comprises:
    determining the current quantity to be a first preset quantity when the current level is greater than or equal to a preset prediction level and less than or equal to a preset level;
    determining first neighbour nodes of the first preset quantity adjacent to the current node among the neighbour nodes of the parent node of the current node, according to a preset shift parameter and the coordinate information of the current node;
    determining the current quantity to be a second preset quantity when the current level is greater than the preset level; and
    determining second neighbour nodes of the second preset quantity among the neighbour nodes of the parent node of the current node, according to the preset shift parameter and the coordinate information of the current node, wherein
    the first preset quantity is less than the second preset quantity, and the current neighbour nodes are the first neighbour nodes or the second neighbour nodes.

3. The method of claim 1, wherein determining the current quantity based on the current level, and determining the current neighbour nodes based on the coordinate information of the current node comprises:
    determining a density of points in each neighbour node of the parent node of the current node based on the current level and the coordinate information of the current node when the current level is greater than or equal to a preset prediction level; and
    determining the current neighbour nodes based on the density of the points, wherein
    the density of the points is negatively correlated with the current quantity.

4. The method of claim 1, wherein determining the current neighbour nodes based on the coordinate information of the current node comprises:
    determining coordinate information and occupancy information of the current neighbour nodes based on a preset shift parameter and the coordinate information of the current node.

5. The method of claim 4, wherein performing intra prediction on the current node based on the coordinate information of the current node and the current neighbour nodes comprises:
   determining node distances between the current node and the current neighbour nodes based on the coordinate information of the current node and the coordinate information of the current neighbour nodes;
   determining, from a preset weight table, weights of the current neighbour nodes based on the node distances and the occupancy information;
   determining an average weight of the current neighbour nodes based on the weights of the current neighbour nodes; and
   performing intra prediction on the current node based on the average weight and determining an intra prediction result.

6. The method of claim 5, wherein performing intra prediction on the current node based on the average weight and determining the intra prediction result comprises:
   performing intra prediction on the current node and determining that the intra prediction result is "occupied", when the average weight is greater than an upper weight threshold;
   performing intra prediction on the current node and determining that the intra prediction result is "non-occupied", when the average weight is less than a lower weight threshold; and
   determining that the intra prediction result is "not predicted" when the average weight is less than or equal to the upper weight threshold and greater than or equal to the lower weight threshold, wherein
   the upper weight threshold comprises a first upper weight threshold and a second upper weight threshold, the lower weight threshold comprises a first lower weight threshold and a second lower weight threshold, the first upper weight threshold and the first lower weight threshold correspond to first neighbour nodes, and the second upper weight threshold and the second lower weight threshold correspond to second neighbour nodes.

7. An intra prediction method, for a decoder and comprising:
   determining coordinate information of a current node and a current level corresponding to the current node;
   determining a current quantity of current neighbour nodes used in intra prediction on the current node based on the current level, wherein the current quantity is positively correlated with the current level, and the current neighbour nodes belongs to neighbour nodes of a parent node of the current node;
   determining the current neighbour nodes based on the coordinate information of the current node; and
   performing intra prediction on the current node based on the coordinate information of the current node and the current neighbour nodes.

8. The method of claim 7, wherein determining the current quantity based on the current level, and determining the current neighbour nodes based on the coordinate information of the current node comprises:
   determining the current quantity to be a first preset quantity when the current level is greater than or equal to a preset prediction level and less than or equal to a preset level;
   determining first neighbour nodes of the first preset quantity adjacent to the current node among the neighbour nodes of the parent node of the current node, according to a preset shift parameter and the coordinate information of the current node;
   determining the current quantity to be a second preset quantity when the current level is greater than the preset level; and
   determining second neighbour nodes of the second preset quantity among the neighbour nodes of the parent node of the current node, according to the preset shift parameter and the coordinate information of the current node, wherein
   the first preset quantity is less than the second preset quantity, and the current neighbour nodes are the first neighbour nodes or the second neighbour nodes.

9. The method of claim 7, wherein determining the current quantity based on the current level, and determining the current neighbour nodes based on the coordinate information of the current node comprises:
   determining a density of points in each neighbour node of the parent node of the current node based on the current level and the coordinate information of the current node when the current level is greater than or equal to a preset prediction level; and
   determining the current neighbour nodes based on the density of the points, wherein
   the density of the points is negatively correlated with the current quantity.

10. The method of claim 7, wherein determining the current neighbour nodes based on the coordinate information of the current node comprises:
    determining coordinate information and occupancy information of the current neighbour nodes based on a preset shift parameter and the coordinate information of the current node.

11. The method of claim 10, wherein performing intra prediction on the current node based on the coordinate information of the current node and the current neighbour nodes comprises:
    determining node distances between the current node and the current neighbour nodes based on the coordinate information of the current node and the coordinate information of the current neighbour nodes;
    determining, from a preset weight table, weights of the current neighbour nodes based on the node distances and the occupancy information;
    determining an average weight of the current neighbour nodes based on the weights of the current neighbour nodes; and
    performing intra prediction on the current node based on the average weight and determining an intra prediction result.

12. The method of claim 11, wherein performing intra prediction on the current node based on the average weight and determining the intra prediction result comprises:
    performing intra prediction on the current node and determining that the intra prediction result is "occupied", when the average weight is greater than an upper weight threshold;
    performing intra prediction on the current node and determining that the intra prediction result is "non-occupied", when the average weight is less than a lower weight threshold; and
    determining that the intra prediction result is "not predicted" when the average weight is less than or equal to the upper weight threshold and greater than or equal to the lower weight threshold, wherein the upper weight threshold comprises a first upper weight threshold and a second upper weight threshold, the lower weight threshold comprises a first lower weight threshold and a second lower weight threshold, the first upper weight threshold and the first lower weight threshold correspond to first neighbour nodes, and the second upper weight threshold and the second lower weight threshold correspond to second neighbour nodes.

13. A decoder comprising:
at least one processor; and
a memory coupled to the at least one processor and storing at least one computer executable instruction thereon which, when executed by the at least one processor, causes the at least one processor to:
   determine coordinate information of a current node and a current level corresponding to the current node;
   determine a current quantity of current neighbour nodes used in intra prediction on the current node based on the current level, wherein the current quantity is positively correlated with the current level, and the current neighbour nodes belongs to neighbour nodes of a parent node of the current node;
   determine the current neighbour nodes based on the coordinate information of the current node; and
   perform intra prediction on the current node based on the coordinate information of the current node and the current neighbour nodes.

14. The decoder of claim 13, wherein the at least one processor configured to determine the current quantity based on the current level, and determine the current neighbour nodes based on the coordinate information of the current node is configured to:
   determine the current quantity to be a first preset quantity when the current level is greater than or equal to a preset prediction level and less than or equal to a preset level;
   determine first neighbour nodes of the first preset quantity adjacent to the current node among the neighbour nodes of the parent node of the current node, according to a preset shift parameter and the coordinate information of the current node;
   determine the current quantity to be a second preset quantity when the current level is greater than the preset level; and
   determine second neighbour nodes of the second preset quantity among the neighbour nodes of the parent node of the current node, according to the preset shift parameter and the coordinate information of the current node, wherein
   the first preset quantity is less than the second preset quantity, and the current neighbour nodes are the first neighbour nodes or the second neighbour nodes.

15. The decoder of claim 13, wherein the at least one processor configured to determine the current quantity based on the current level, and determine the current neighbour nodes based on the coordinate information of the current node is configured to:
   determine a density of points in each neighbour node of the parent node of the current node based on the current level and the coordinate information of the current node when the current level is greater than or equal to a preset prediction level; and
   determine the current neighbour nodes based on the density of the points, wherein
   the density of the points is negatively correlated with the current quantity.

16. The decoder of claim 13, wherein the at least one processor configured to determine the current neighbour nodes based on the coordinate information of the current node is configured to:
   determine coordinate information and occupancy information of the current neighbour nodes based on a preset shift parameter and the coordinate information of the current node.

17. The decoder of claim 16, wherein the at least one processor configured to perform intra prediction on the current node based on the coordinate information of the current node and the current neighbour nodes is configured to:
   determine node distances between the current node and the current neighbour nodes based on the coordinate information of the current node and the coordinate information of the current neighbour nodes;
   determine, from a preset weight table, weights of the current neighbour nodes based on the node distances and the occupancy information;
   determine an average weight of the current neighbour nodes based on the weights of the current neighbour nodes; and
   perform intra prediction on the current node based on the average weight and determine an intra prediction result.

18. The decoder of claim 17, wherein the at least one processor configured to perform intra prediction on the current node based on the average weight and determine the intra prediction result is configured to:
   perform intra prediction on the current node and determine that the intra prediction result is "occupied", when the average weight is greater than an upper weight threshold;
   perform intra prediction on the current node and determine that the intra prediction result is "non-occupied", when the average weight is less than a lower weight threshold; and
   determine that the intra prediction result is "not predicted" when the average weight is less than or equal to the upper weight threshold and greater than or equal to the lower weight threshold, wherein
   the upper weight threshold comprises a first upper weight threshold and a second upper weight threshold, the lower weight threshold comprises a first lower weight threshold and a second lower weight threshold, the first upper weight threshold and the first lower weight threshold correspond to first neighbour nodes, and the second upper weight threshold and the second lower weight threshold correspond to second neighbour nodes.

19. The decoder of claim 14, wherein the first preset quantity is 6 and the second preset quantity is 26.

20. An encoder, comprising at least one processor and a memory coupled to the at least one processor and storing at least one computer executable instruction thereon which, when executed by the at least one processor, causes the at least one processor to perform the method of claim 1.

* * * * *